United States Patent [19]
Gomez

[11] Patent Number: 5,904,119
[45] Date of Patent: May 18, 1999

[54] FURNACE APPARATUS FOR FLUIDIZED BED PROCESSES

[75] Inventor: Adersido Gomez, Bolivar, Venezuela

[73] Assignee: Brifer International Ltd., Bridgetown, Barbados

[21] Appl. No.: 08/882,887

[22] Filed: Jun. 26, 1997

[51] Int. Cl.⁶ ..................................................... F22B 1/00
[52] U.S. Cl. ............................ 122/4 D; 110/245; 432/58
[58] Field of Search ......................... 432/58, 15; 110/245; 122/4 D

[56] References Cited

U.S. PATENT DOCUMENTS

| | | |
|---|---|---|
| 3,910,769 | 10/1975 | Mayer et al. ............................. 23/284 |
| 4,107,851 | 8/1978 | Takacs et al. ............................. 432/58 |
| 4,257,171 | 3/1981 | Johnson et al. ............................ 432/58 |
| 5,026,269 | 6/1991 | Ruottu .................................... 110/245 |
| 5,156,545 | 10/1992 | Deblock et al. .......................... 432/58 |
| 5,183,641 | 2/1993 | Isaksson ................................. 110/245 |

*Primary Examiner*—Teresa Walberg
*Assistant Examiner*—Jiping Lu
*Attorney, Agent, or Firm*—Bachman & LaPointe, P.C.

[57] ABSTRACT

A fluidized bed reactor includes a plurality of nozzles for introducing a fluidizing gas wherein at least some of the nozzles are provided with a plate proximate to the nozzle inlet which redirects the flow of the fluidizing gas to the nozzles. By providing a plate at the inlet of the nozzles the following is accomplished. Even flow distribution of the fluidizing gas through the nozzle is achieved. The pressure drop through the nozzle remains relatively high thus insuring good fluidizing gas acceleration which eliminates the adherence of the fines to the interior surface of the nozzle.

23 Claims, 2 Drawing Sheets

FURNACE APPARATUS FOR FLUIDIZED BED PROCESSES

BACKGROUND OF THE INVENTION

The present invention relates to an apparatus for use in fluidized solid systems and, more particularly, an apparatus which is particularly useful in the direct reduction of iron ores in a fluidized bed process.

A fluidized process of considerable importance relates to the direct reduction of iron ores. In typical fluidized processes for the reduction of iron ores, iron oxides are progressively reduced in a vertical vessel (reactor) having a single reduction stage or, more commonly, a series of reduction stages. In such processes, the ore to be reduced is fed into the top of the vessel and flows downwardly in counter current relationship to the flow of a fluidizing gas ascending in the vessel. The fluidizing gas comprises a hot reducing gas which consists generally of carbon monoxide, hydrogen and other known gas mixtures.

The fluidizing gases are delivered to the fluidizing bed for contact with the iron ore through a plurality of nozzles and provided in a horizontal wall disposed within the vessel. There is a considerable problem caused by the fouling and plugging of these nozzles particularly in fluidized processes for the direct reduction of iron ores. The fouling or plugging of the nozzles is associated with adherence of "fines" of metallic particles which adhere to the inner walls of the nozzles, build up on the inner walls and eventually plug the nozzles completely. It has been proposed in U.S. Pat. No. 3,910,769 to provide a baffle at the fluidizing gas inlet in combination with conical shaped nozzles so as to provide a preferential flow through the nozzles in a manner which would avoid adherence of the fines to the interior wall surface of the nozzles. While such a design has proven to be beneficial, the design has resulted in problems particularly with respect to the outer rings of nozzles. It has been found that the baffle plate causes a preferential deposition of the fines in the outer rings of the nozzles and, more particularly on a portion of the wall of the outer ring of the nozzles. This build-up results from a flow caused by the baffle plate which results in strong cross-flow at the nozzle inlets. Accordingly, the principal object of the present invention to provide a mechanism which eliminates the cross-flow at the nozzle inlets of the outer ring of nozzles thereby eliminating the excess build-up of fines on the outer ring of nozzles.

SUMMARY OF THE INVENTION

According to the present invention at least the outer rings of nozzles in a fluidized bed apparatus is provided with a plate proximate to the nozzle inlet which redirects the flow of the fluidizing gas to the nozzles. By providing a plate at the inlet of the nozzles the following is accomplished. Even flow distribution of the fluidizing gas through the nozzle is achieved. The pressure drop through the nozzle remains relatively high thus insuring good fluidizing gas acceleration which eliminates the adherence of the fines to the interior surface of the nozzle. Further objects and advantages of the present invention will appear hereinbelow.

DETAILED DESCRIPTION

Figure 1:
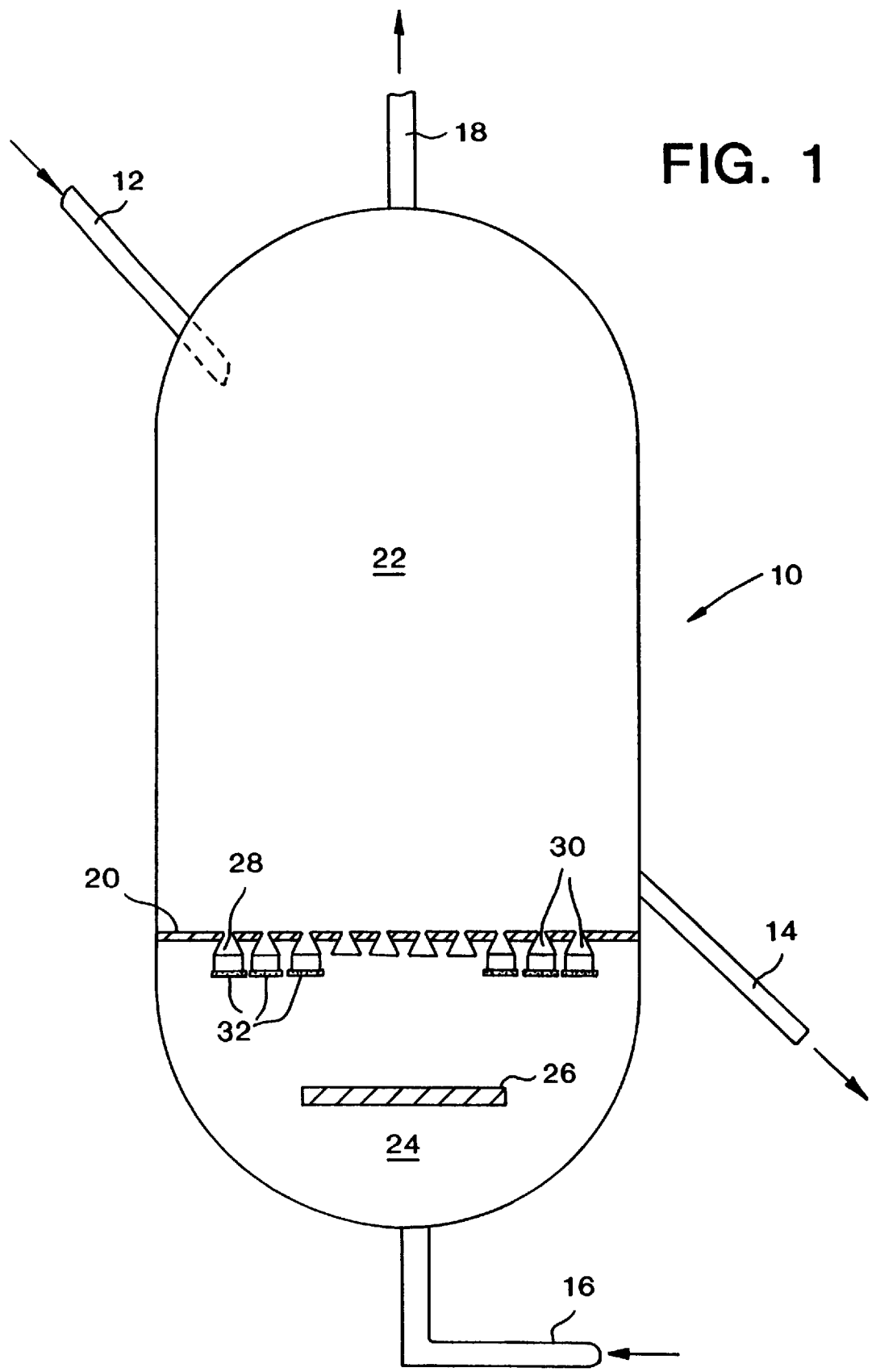
FIG. 1 is a schematic view of a vessel of a fluidized bed type illustrating the improved nozzle construction of the apparatus in accordance with the present invention.

While the invention will be described with particular reference to a single bed reactor as schematically illustrated in FIG. 1, the invention is equally applicable to multi-bed reactors of the type described in U.S. Pat. No. 3,910,769 as well as to a plurality of single bed reactors provided in theories.

With specific reference to FIG. 1, there is shown a vertical reactor 10 of the type employed in the direct reduction of iron oxides. Particulate iron ore solids are fed to the vessel 10 via solids inlet 12 at the top of the vessel 10. The reduced iron ore is removed from the bottom of the vessel 10 via solids outlet 14. A fluidizing gas in the form of a hot reducing gas is fed into the bottom of the vessel 10 via fluidizing gas inlet 16. The spent reducing gas is recovered from the top of the vessel 10 via line 18.

The vessel 10 is divided by wall means 20 into a fluidized solids section 22 above wall means 20 and a fluidizing gas feed section 24 below the wall 20.

The fluidizing gas feed section is provided with a baffle 26 proximate to and downstream of the inlet 16 for distributing the fluidizing gas fed from the fluidizing gas inlet 16 toward a plurality of nozzles 28 provided in wall 20. As noted above, the baffle 26 causes a preferential cross-flow at the inlet of the outer ring of nozzles 28 provided in the wall 20. This results in a build-up of fines on a portion of the wall 30 of the outer ring of nozzles. In order to avoid this phenomena at least the outer rings of nozzles 28 in wall 20 are provided with individual plates 32 which act to redirect the fluidizing gas so as to provide good distribution of flow of the fluidizing gas through the nozzles 28.

Figure 2:
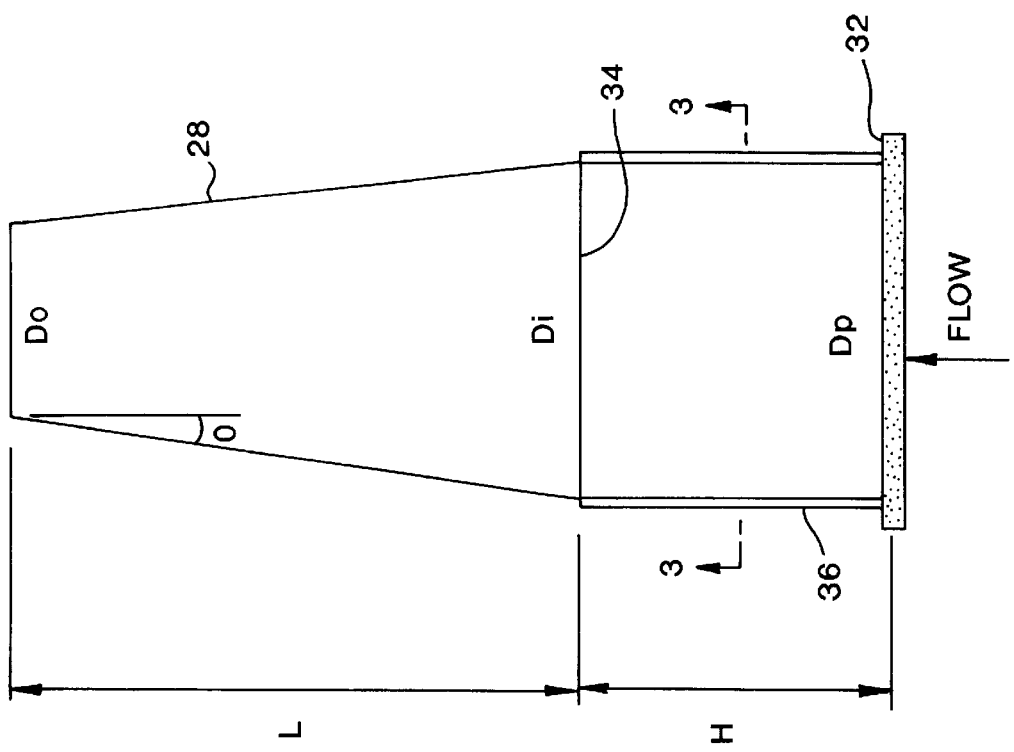
FIG. 2 is an enlarged view of the nozzle design in accordance with the present invention.

With reference to FIG. 2, the nozzle design of the present invention will be described in detail. Each of the nozzles 28, or at least the nozzles which comprise the outer ring of nozzles 28 in wall member 20, is provided with a plate 32 proximate to the inlet opening 34 of the nozzle for redirecting the flow of the fluidizing gas so as to achieve uniform fluidizing gas flow through the nozzle. In accordance with the present invention the plate 32 has a diameter Dp which is greater than the inlet diameter Di of the nozzle 28. It has been found that the plate 32 should be spaced from the inlet 34 of the nozzle a relatively short distance H in order to insure effective redirecting of the fluidizing gas flow while at the same time not adversely affecting the access of the fluidizing gas to the inlet 34 of the nozzle 28. The distance H in combination with the diameter Dp of the plate insure optimum flow of the fluidizing gas through the nozzle 28. The nozzles 28 are conical shaped having sidewalls which form an angle $\alpha$ which insures acceleration of the fluidizing gas through the nozzle so as to further prevent the adherence of fines to the inside surface of the nozzles. The shape and size of the nozzle 28 in combination with the size and location of the plate 32 relative to the inlet 34 of the nozzle insures optimum fluidizing gas flow.

In accordance with the present invention it has been found preferable that the conical shaped nozzles have a length of between about 330 mm to 450 mm, an inlet diameter Di of between about 100 mm to 120 mm, an outlet diameter Do of between about 35 mm to 45 mm, and an angle $\alpha$ of between about 5° to about 8° are particularly useful in fluidized bed reactors used in the direct reduction of iron oxides. With such a nozzle design it has been found that the plate 32 should be disposed from the inlet 34 and the nozzle 28 a distance H of between about 125 mm to about 225 mm and that the diameter Dp of the plate should be between 150 mm to 230 mm. The design of the plate 32 with respect to the nozzle 28 as set forth above optimizes the redirection of the fluidizing gas and the flow of the fluidizing gas through the nozzle 28.

While the dimensions of the nozzles are preferably within the ranges given above, the nozzles should maintain the following dimensional relationships: ratio $(Di-Do)/L=2\times\tan\alpha=0.175$ to $0.281$, ratio $(Di/Do)=2.6$ to $4.8$, and angle $\alpha$ of between about $5°$ to $8°$. With such a nozzle design it has been found that the plate 32 should be disposed from the inlet 34 of the nozzle 28 a distance H according to the ratio $(L/H)=2$ to $4.1$, and that the ratio between diameter Dp of the plate and inlet diameter Di should be $(Dp/Di)=1.3$ to $1.6$.

Figure 3:
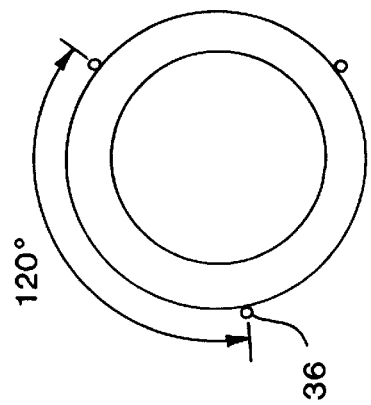
FIG. 3 is a sectional view taken along line 22 of FIG. 1.

In accordance with the present invention the plate 32 is secured to the nozzle 28 at the desired distance H by means of a plurality of support members 36 in the form of rods or the like which are secured to the nozzle at an angular spacing of about 120° as illustrated in FIG. 3. The rods 36 may be secured to the nozzle 28 and to the plate 32 by means of soldering or the like. Preferably the rods 36 are made as small as possible so as to provide the necessary support for the plate 32 on the nozzle 28 while at the same time not interfering with the access of the fluidizing gas to the inlet 34 of the nozzle 28.

The nozzle design of the present invention insures a smooth access to the inlet 34 of the nozzle 28 by fluidizing gas, eliminates the problem of strong cross-flow at the inlet of the nozzles and thus eliminates the selective buildup of fines on the outside surfaces of the nozzles particularly with regard to the nozzles in the outer ring of the wall 20. In accordance with the present invention, all of the nozzles may be provided with a plate 32 in accordance with the present invention; however, in certain applications it may only be necessary to provide the nozzles of the outer ring of nozzles with the plates 32.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A furnace apparatus for use in fluidized solid system comprising:

a vessel defining a flow path for said fluidized solids;

solids inlet means for introducing solids into said vessel in a first direction;

fluidizing gas inlet means for introducing fluidizing gas into said vessel in a second direction substantially counter current to said first direction;

solids outlet means for removing said fluidized solids from said vessel;

fluidizing gas outlet means for removing said fluidizing gas from said vessel;

wall means disposed in said vessel between said solids inlet means and said fluidizing gas inlet means for dividing said vessel into a fluidized solids section and a fluidizing gas feed section;

a plurality of nozzles having an internal surface located in said wall means, each of said plurality of nozzles having an inlet and an outlet for communicating fluidizing gas from said fluidizing gas feed section to said fluidized solids section;

baffle means located in said fluidizing gas feed section between said wall means and said fluidizing gas inlet means for distributing fluidizing gas feed from said fluidizing gas inlet means toward said plurality of nozzles; and means proximate to and space from the inlet of at least some of said plurality of nozzles a distance H for redirecting said fluidizing gas flow through said at least some of said plurality of nozzles so as to reduce the adherence of fines to the internal surface of said nozzles and wherein the distance H is large enough so as to not prohibit passage of solids from said solids section through said at least some of said plurality of nozzles to said gas feed section.

2. A furnace apparatus for use in the direct reduction of iron ore particles comprising:

a vessel defining a flow path for said iron ore particles;

iron ore inlet means for introducing iron ore into said vessel in a first direction;

reducing gas inlet means for introducing reducing gas containing metal fines into said vessel in a second direction substantially counter current to said first direction;

iron ore outlet means for removing said iron ore from said vessel;

reducing gas outlet means for removing said reducing gas from said vessel;

wall means disposed in said vessel between said iron ore inlet means and said reducing gas inlet means for dividing said vessel into a iron ore reduction section and a reducing gas feed section;

a plurality of nozzles having an internal surface located in said wall means, each of said plurality of nozzles having an inlet and an outlet for communicating reducing gas from said reducing gas feed section to said iron ore section;

baffle means located in said reducing gas feed section between said wall means and said reducing gas inlet means for distributing reducing gas feed from said reducing gas inlet means toward said plurality of nozzles; and means proximate to and space from the inlet of at least some of said plurality of nozzles a distance H for redirecting said reducing gas flow through said at least some of said plurality of nozzles so as to reduce the adherence of fines to the internal surface of said nozzles and wherein the distance H is large enough to prevent a build up of metal fines in said nozzles.

3. An apparatus according to claim 1 or 2 wherein said plurality of nozzles are conical shape having an inlet diameter Di and an outlet diameter Do where Di is greater than Do.

4. An apparatus according to claim 3 wherein said plate means has a diameter Dp where Dp is greater than Di.

5. An apparatus according to claim 4 wherein Dp is between about 150 mm to 230 mm.

6. An apparatus according to claim 4 wherein Do is between about 35 mm to 45 mm, Di is between about 100 mm to 120 mm and the nozzle has a length L of between about 330 mm to 450 mm.

7. An apparatus according to claim 6 wherein Dp is between about 150 mm to 230 mm.

8. An apparatus according to claim 7 including support means secured to said nozzles for supporting said plate means over said nozzle inlet a distance H therefrom.

9. An apparatus according to claim 8 wherein H is between about 125 mm to about 225 mm.

10. An apparatus according to claim 9 wherein the conical shaped nozzles having a sidewall portion forming an angle α of between about 5° to about 8°.

11. An apparatus according to claim 6 wherein the ratio (Dp/Di)=1.3 to 1.6.

12. An apparatus according to claim 8 wherein the ratio (L/H)=2 to 4.1.

13. An apparatus according to claim 4 wherein the ratio (Dp/Di)=1.3 to 1.6.

14. An apparatus according to claim 4 wherein the ratio (Di/Do)=2.6 to 4.8.

15. An apparatus according to claim 3 wherein the conical shaped nozzles having a sidewall portion forming an angle α of between about 5° to about 8°.

16. An apparatus according to claim 3 wherein Do is between about 35 mm to 45 mm, Di is between about 100 mm to 120 mm and the nozzle has a length L of between about 330 mm to 450 mm.

17. An apparatus according to claim 3 wherein the ratio (Di/Do)=2.6 to 4.8.

18. An apparatus according to claim 3 wherein the ratio (Di−Do)/L=2×tan α 0.175 to 0.281 where L is the length of the nozzle.

19. An apparatus according to claim 1 or 2 including support means secured to said nozzles for supporting said plate means over said nozzle inlet a distance H therefrom.

20. An apparatus according to claim 19 wherein H is between about 125 mm to about 225 mm.

21. An apparatus according to claim 19 wherein said support means comprises three rods secured to the nozzle at an angular spacing of about 120°.

22. An apparatus according to claim 19 wherein the ratio (L/H)=2 to 4.1 where L is the lenth of the nozzle.

23. An apparatus according to claim 1 or 2 wherein the distance H is at least about 125 mm.

\* \* \* \* \*